United States Patent
DePottey et al.

(10) Patent No.: US 6,948,736 B2
(45) Date of Patent: Sep. 27, 2005

(54) SUN VISOR ATTACHMENT FOR AN OVERHEAD AIRBAG

(75) Inventors: Timothy A. DePottey, Flint, MI (US); David W. Schneider, Waterford, MI (US); ChangSoo Choi, Rochester, MI (US); David L. Dominssini, Allen Park, MI (US)

(73) Assignee: Autoliv ASP, Inc., Ogden, UT (US)

( * ) Notice: Subject to any disclaimer, the term of this patent is extended or adjusted under 35 U.S.C. 154(b) by 43 days.

(21) Appl. No.: 10/645,391

(22) Filed: Aug. 21, 2003

(65) Prior Publication Data

US 2005/0040627 A1 Feb. 24, 2005

(51) Int. Cl.⁷ .............................................. B60R 21/16
(52) U.S. Cl. ............................................... 280/728.2
(58) Field of Search ........................ 280/728.2, 728.1, 280/730.1, 730.2, 732, 743.1

(56) References Cited

U.S. PATENT DOCUMENTS

| | | |
|---|---|---|
| 4,536,008 A | 8/1985 | Brown, Jr. |
| 6,173,990 B1 | 1/2001 | Nakajima et al. |
| 6,179,366 B1 | 1/2001 | Hansz |
| 6,334,626 B2 | 1/2002 | Nakajima et al. |
| 6,367,872 B1 | 4/2002 | Böhm et al. |
| 6,547,308 B2 | 4/2003 | Hamelink et al. |
| 6,588,793 B2 | 7/2003 | Rose |
| 6,604,773 B2 * | 8/2003 | Aoki et al. ................ 296/97.9 |

FOREIGN PATENT DOCUMENTS

| | | | |
|---|---|---|---|
| JP | 7-117605 | 5/1995 | |
| JP | 2001301460 A | * 10/2001 | .............. B60J/3/02 |
| JP | 2002274173 A | * 9/2002 | .............. B60J/3/02 |

* cited by examiner

*Primary Examiner*—Faye M. Fleming
(74) *Attorney, Agent, or Firm*—Sally J. Brown

(57) ABSTRACT

A sun visor attachment for mounting a sun visor is disclosed. The sun visor attachment enables a sun visor assembly to be attached out of a trajectory of an overhead airbag. A sun visor assembly can be rigidly attached either on the overhead airbag module housing containing mounting brackets rearward of the deployment door, or it can be rigidly attached to a resilient substrate affixed between a headliner and the overhead airbag module behind the airbag outlet.

42 Claims, 9 Drawing Sheets

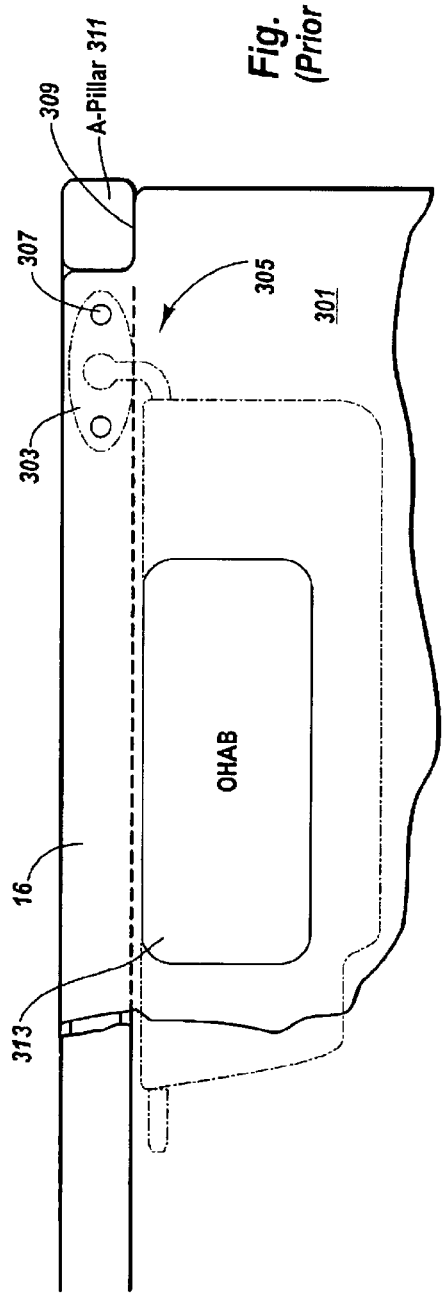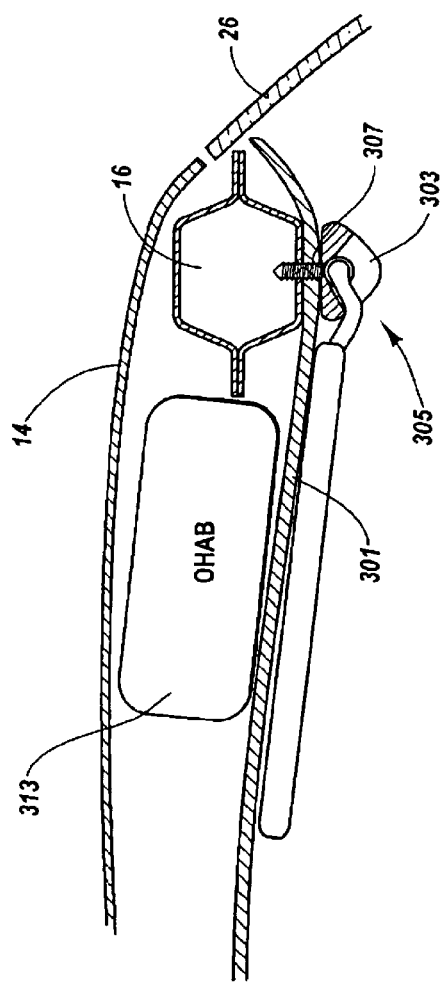

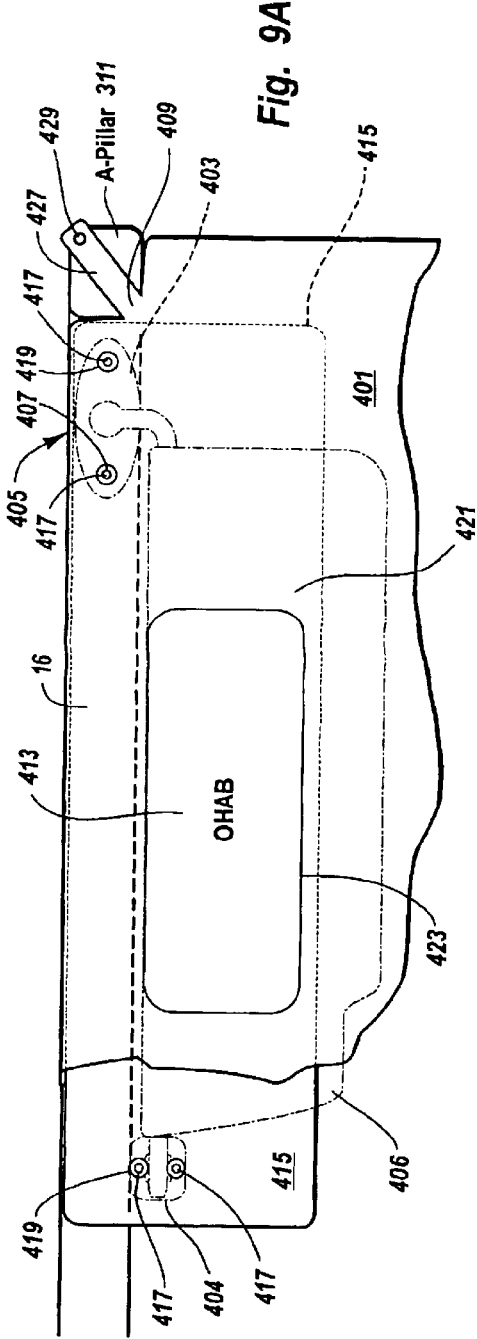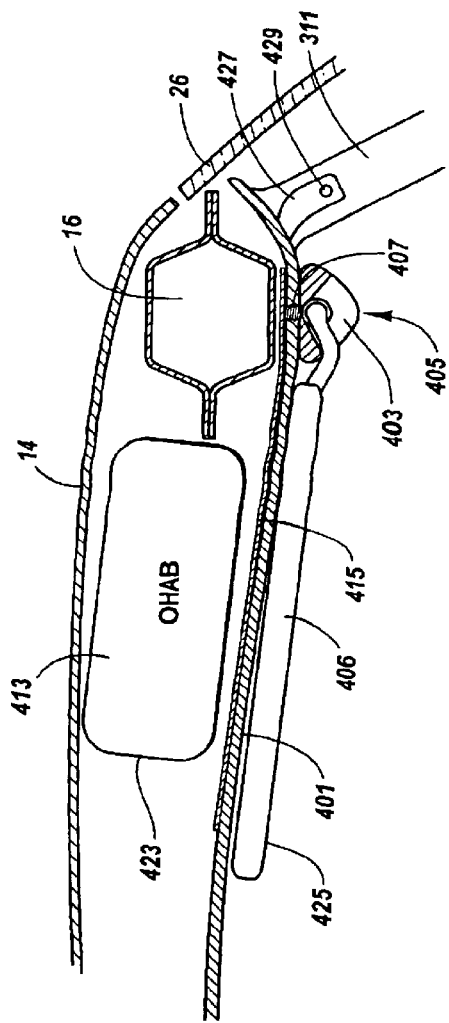

SUN VISOR ATTACHMENT FOR AN OVERHEAD AIRBAG

BACKGROUND OF THE INVENTION

1. Field of the Invention

The present invention relates to sun visor systems for use in motor vehicles. More specifically, the present invention relates to a sun visor attachment used in conjunction with an overhead airbag.

2. Description of Related Art

Sun visors of various constructions have been used in vehicles for shielding the vehicle occupant's eyes from the passage of sunlight through an upper portion of the vehicle's windshield or side window. Conventional sun visors usually consist of a single panel attached to a pivot rod that provides structural support for the panel and allows the panel to swivel from either the windshield or the side window to block incident sun rays. Most sun visors typically are attached to the vehicle header rail through the headliner on an outboard side of the vehicle. A second mount is often used on the inboard side of the vehicle which serves as a detachable clip for the pivot rod so the sun visor can be secured in its storage position, but then pivot to cover the side window if desired.

Attaching the sun visor to the header allows for the sun visor to be rigidly connected to the vehicle so the visor does not detach from or damage the headliner when a vehicle occupant moves the visor from its storage position to a deployed position covering the upper portion of the windshield or side window. Attaching the sun visor to the header also has been used as a way to keep the headliner secured to the roof of the vehicle.

Another device often used in vehicles is inflatable airbags, which have been credited with preventing numerous deaths and injuries. Some statistics estimate that frontal airbags reduce the fatalities in head-on collisions by 25% among drivers using seat belts and by more than 30% among unbelted drivers. Statistics further suggest that with a combination of seat belt and airbag, serious chest injuries in frontal collisions can be reduced by 65% and serious head injuries by up to 75%. Airbag use presents clear benefits and vehicle owners are frequently willing to pay the added expense for airbags.

Most airbag apparatuses have been primarily designed for deployment in front of the torso of an occupant between the occupant's upper torso and the instrument panel. Conventional airbag modules for frontal occupant protection deploy from the instrument panel (passenger side) or from the steering wheel (driver side). This location has several disadvantages including poor out of position performance and unaesthetic visible instrument panels or steering wheel tear seams.

A more progressive approach to airbag apparatuses has been to install airbag modules between the roof and the headliner of a vehicle. Overhead airbags have responded to some of the problems and needs associated with conventional airbags. When an overhead airbag is initially deployed, the cushion inflates substantially parallel to the windshield. The cushion descends from proximate the header of the vehicle to cover a majority of the area between the occupant and the front of the vehicle interior. The cushion then expands toward the expected occupant position. This arrangement provides better out of position protection by protecting the occupant from impact with the front window, flying shards of glass, and other projectiles. The overhead airbag may also help to keep the occupant inside the vehicle during an endover or hard frontal collision rollover accident.

One concern regarding the use of overhead airbags is the interaction of the deploying cushion with the sun visor. Since conventional sun visors are attached to the header, the visor pivot arm is in the path of the deploying overhead airbag. As the airbag rapidly inflates, its interaction with the pivot rod or the visor panel can cause the visor to separate from its attachment or become fragmented, creating a dangerous projectile that is capable of injuring the vehicle occupants.

Furthermore, since conventional sun visors are located in the path of airbag deployment, the sun visor can impede the trajectory of the deploying airbag. This causes poor positioning of the cushion and inadequate occupant restraint. Consequently, the risk of occupant injury increases, including injury caused by the airbag itself.

The use of some non-conventional visors in conjunction with overhead airbag applications can also be problematic. If a non-conventional visor looks different than a conventional one it may not be as aesthetically pleasing to vehicle occupants, causing a decrease in demand for that particular vehicle. Furthermore, vehicle occupants may find it frustrating when their non-conventional visor operates in a different fashion from what they are used to in a conventional visor system. A difference in visor operation has safety risks inherent in itself. For instance, an occupant may become distracted while driving in trying to determine how to actuate the visor, whereby the occupant's inattentiveness to driving conditions may cause an accident. Moreover, some non-conventional visors may be expensive to install if it requires installation procedures much different from conventional systems.

Moving a conventional visor from its common position on the vehicle header also poses a dilemma. The vehicle header provides structural support for a rigid attachment of the sun visor to the vehicle. Without the structural support supplied by the header the sun visor would become easily detached from the more flimsy headliner when actuated by an occupant. Permanent damage to the headliner could occur by the force applied to the visor assembly when a vehicle user actuates the visor. Furthermore, the sun visor attachment is typically used to mount the headliner to the header keeping the headliner proximate the vehicle roof. By not mounting the visor to the header, the headliner will not maintain its rigidity and could become detached from the vehicle roof.

Accordingly, a need exists for a sun visor attachment system that addresses the problems associated with the use of overhead airbags. Specifically, a sun visor attachment system is needed which will prevent the deploying airbag cushion from impinging on the sun visor pivot rod or panel so that the sun visor does not fragment or separate from its attachment possibly causing injury to the vehicle occupants. It is also desirable for the sun visor not to impede the trajectory of the deploying overhead airbag so the cushion is positioned correctly and proper occupant restraint is achieved.

It is further desirable that a sun visor attachment system that meets the above needs also maintains the aesthetic characteristics of a conventional visor, or the system incorporates an actual conventional visor mount and panel. This is desirable for aesthetic concerns that have an impact on consumer demand for a particular vehicle. Furthermore, it is desirable that the overhead airbag-compatible sun visor attachment system operates the same way as conventional visor systems so vehicle occupants are not frustrated by a use different from what they are accustomed to. Additionally, it is preferable that a sun visor system for use in conjunction with overhead airbags use a similar installation procedure as a conventional visor system so that the new system is simple to install, thereby creating a cost savings.

It is also desirable that a sun visor attachment system that meets the above needs also have rigid structural support so that the sun visor does not become detached from or deform the headliner when a vehicle user actuates the visor. Additionally, it would be desirable to keep the headliner rigidly in place proximate the vehicle roof.

The present invention as disclosed and claimed herewith meets these needs.

SUMMARY OF THE INVENTION

The apparatus of the present invention has been developed in response to the present state of the art, and in particular, in response to the problems and needs in the art that have not yet been fully solved by currently available sun visor attachment systems. Thus, the present invention provides a sun visor attachment assembly to be used in conjunction with an overhead airbag. The sun visor attachment assembly avoids the problems associated with a deploying overhead airbag impinging against a sun visor by moving the visor attachment rearward of the overhead airbag module outlet or door, out of the trajectory of the rapidly expanding airbag cushion upon deployment. The sun visor is rigidly attached adjacent the headliner in several configurations so that the sun visor does not become detached from the vehicle roof or damage the headliner when actuated.

In accordance with the invention as embodied and broadly described herein, an overhead airbag module housing for sun visor attachment is provided. According to one configuration, the overhead airbag module housing may have a cavity for containing an airbag located above a vehicle passenger between the headliner and the vehicle roof. An outlet or door in the overhead airbag module housing is located near the vehicle header rail such that the airbag deploys through the door parallel to the windshield and in front of a passenger in a collision. A mounting bracket or support beam is located on the module housing just rearward of the overhead airbag module door.

A sun visor can be attached to this mounting bracket or support beam in a manner that allows the sun visor to swivel from a storage position to an actuated position covering an upper portion of the windshield. The sun visor can also pivot from the actuated position to a second actuated position where the sun visor covers an upper portion of a side window. The mounting bracket is placed rearward of the airbag module door so the sun visor mounted to it does not interfere with or impede the trajectory of the airbag cushion when deployed. Consequently, the sun visor remains attached to the overhead airbag module housing during the deploying event and does not fragment or separate from its mount creating a dangerous projectile.

The mounting bracket could be a separate bracket attached to the housing for accepting a sun visor mount, or it could be an integral, inseparable part of the overhead airbag module housing, which forms a bracket structure upon which a sun visor mount could be attached. The bracket structure is an undivided, contiguous section of the airbag module housing that provides a place for sun visor attachment, but also defines a portion of the cavity that houses the airbag itself. More than one mounting bracket could exist on the airbag module housing so there are more than one sun visor attachment locations on the module housing. For instance, one bracket could be located on an outboard side of the airbag module housing where the sun visor permanently and pivotably connects. The second bracket would then be located on an inboard side of the module housing where the sun visor detachably connects, so the visor can be moved from covering the upper portion of the windshield, to covering the upper portion of the side window. Like the first mounting bracket, the second mounting bracket is also located rearward of the overhead airbag module housing door.

The mounting bracket or brackets are positioned on the region of the airbag module housing that defines the cavity for storing the inactivated airbag cushion. In this configuration the mounting bracket forms a recess in the airbag module housing so any fasteners used to mount the sun visor to the module housing would be disposed within that recess and avoid contact with the uninflated cushion. Alternatively, the sun visor could be attached to portions of the airbag module housing adjacent to, but not part of, the cavity that contains the airbag. This portion could be an arm that extends off of the airbag module housing or any portion of the housing rearward of the door that could receive a sun visor fastener. In this alternative configuration the sun visor fasteners would not be in contact with the uninflated cushion.

Furthermore, the sun visor could attach to both the overhead airbag module housing and the header of the vehicle. In this configuration, the sun visor would permanently attach to the mounting bracket or beam on the outboard side of the vehicle. The visor is then detachably connected to the header on the inboard side of the vehicle. In this configuration the sun visor maintains a position rearward of the airbag module housing door so that the trajectory of the inflating overhead airbag is not impeded.

In all the above configurations, the housing could have anchors disposed at locations in the housing that receive fasteners that mount the sun visor assembly to the airbag housing. These anchors could consist of a wide range of components from weld nuts to apertures in the housing positioned to receive the sun visor attachment fasteners.

According to another alternative, a sun visor attachment assembly may be a resilient substrate disposed between the headliner and the overhead airbag module. This substrate is located just outside of the airbag module housing outlet through which the airbag deploys upon activation. The outlet of the overhead airbag module is therefore disposed between the substrate and the header rail of the vehicle frame, so that the airbag deploys between the two and substantially parallel to the windshield of the vehicle. The sun visor is then attached to this substrate through the headliner such that the sun visor is also located rearward of the airbag module outlet so the visor does not interfere with the trajectory of the deploying airbag. The substrate can be affixed to the inside of the headliner by glue or other adhesives.

The substrate is composed of material that is more rigid than the flimsy headliner, but somewhat flexible so it does not fracture upon the pressure applied against it when the overhead airbag is activated and inflated. This allows for rigid attachment of the sun visor to the substrate. In one embodiment the substrate is a resilient steel plate. Alternatively, it could be a resilient injection molded plate or other material with similar physical properties.

The substrate has an area large enough to spread an actuation load when a vehicle passenger moves the sun visor from a stored position to an actuated position and back again. Therefore, the sun visor does not become detached from or damage the headliner when the passenger pulls on the sun visor to move it to a desired position because the force created by the passenger is spread across the area of the substrate and against a larger area of the headliner than it would be if the sun visor were attached simply to the headliner.

The substrate further has defined locations for receiving the fasteners used to attach the sun visor assembly to the substrate. These defined locations could contain weld nuts or other similar fastener-attaching devices such as nuts, caps, clamps, catches and the like for retaining the fasteners in position.

The location of the substrate on the headliner, relative to the overhead airbag module housing door defines an area of the headliner that flexes when the airbag is deployed. By defining the limited area of the headliner that can flex the substrate prevents the headliner for permanently deforming when flexing upon deployment of the airbag. Furthermore, the area of the headliner that flexes also channels the trajectory of the deploying airbag so that it inflates in its proper deployment position.

Additionally, the substrate affixed between the headliner and the overhead airbag module housing is thin enough so that the vehicle passenger is unable to detect an appreciable difference between the sun visor assembly attached to the substrate and a conventional sun visor that is attached to the header of the vehicle.

In conventional sun visor configurations the headliner is secured in its position by the attachment of the sun visor to the header through the headliner. The headliner of the present invention contains a flap for mounting the headliner to a vehicle frame. This flap is used to secure the headliner to the vehicle frame in place of using the sun visor attachment as an anchor for the headliner. In one embodiment the mounting flap is a strap that is cut out from the headliner material that can be secured to an A-pillar, which is the post of the vehicle frame in the corner between the windshield and the front side window. The A-pillar trim then covers the mounting location of the headliner to the A-pillar.

These and other features and advantages of the present invention will become more fully apparent from the following description and appended claims, or may be learned by the practice of the invention as set forth hereinafter.

BRIEF DESCRIPTION OF THE DRAWINGS

In order that the manner in which the above-recited and other features and advantages of the invention are obtained will be readily understood, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which:

FIG. 8A is a plan view of a conventional headliner, which is secured to the header by a sun visor attachment;

FIG. 8B is a side elevation, sectional view of the conventional headliner, which is secured to the header by a sun visor attachment;

FIG. 9A is a cut-away plan view of a headliner attached to an A-pillar of a vehicle when a sun visor is attached to an attachment substrate within the headliner; and FIG. 9B is a side elevation, sectional view of a headliner attached to an A-pillar of a vehicle when a sun visor is attached to an attachment substrate within the headliner.

DETAILED DESCRIPTION OF THE PREFERRED EMBODIMENTS

The presently preferred embodiments of the present invention will be best understood by reference to the drawings, wherein like parts are designated by like numerals throughout. It will be readily understood that the components of the present invention, as generally described and illustrated in the figures herein, could be arranged and designed in a wide variety of different configurations. Thus, the following more detailed description of the embodiments of the apparatus, system, and method of the present invention, as represented in FIGS. 1 through 9B, is not intended to limit the scope of the invention, as claimed, but is merely representative of presently preferred embodiments of the invention.

Figure 1:
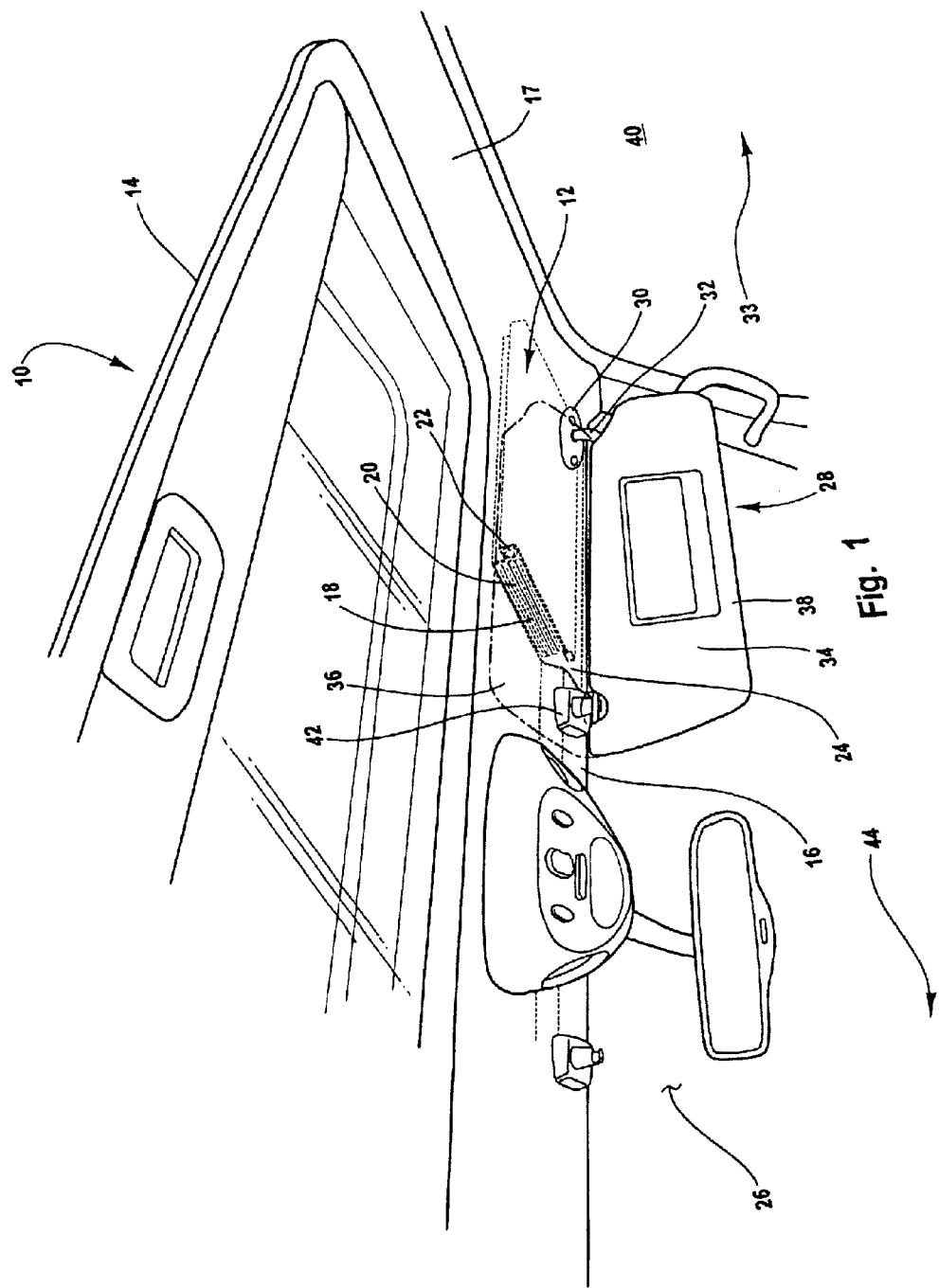
FIG. 1 is a perspective view of the inside of a motor vehicle displaying a sun visor attached to one embodiment of the overhead airbag module housing.

Referring to FIG. 1, the inside passenger compartment of a vehicle 10 is depicted from a perspective view. An overhead airbag module housing 12 is shown located proximate the roof 14 and the header rail 16 of the vehicle 10. The overhead airbag module housing 12 is disposed between the roof 14 and the headliner 17 of the vehicle 10. The overhead airbag module housing 12 defines a cavity 18 for storing an uninflated overhead airbag 20 and its inflator 22. The overhead airbag module housing 12 has an opening 24 through which the overhead airbag 20 deploys. Upon deployment, the overhead airbag 20 extends in a direction substantially parallel to the windshield 26.

A sun visor assembly 28 is shown attached to the overhead airbag module housing 12 by a first mount 30. The first mount 30 is pivotably connected to a visor pivot rod 32 on an outboard side 33 of the vehicle 10. The pivot rod 32 is then connected to and gives structural support for the visor panel 34. The visor panel 34 is capable of being disposed in a retained position 36 which is adjacent the headliner 17, and substantially parallel to a plane containing the vehicle roof 14. The visor panel 34 can also be disposed in a first deployed position 38 which covers an upper portion of the windshield 26. The pivot rod 32 also allows the visor to swivel from the first deployed position 38 to cover the upper portion of the side window 40 of the vehicle 10.

The sun visor assembly 28 further has a second mount 42 located on an inboard side 44 of the vehicle 10. In the configuration depicted in FIG. 1, the second mount 42 is attached to the header 16. However, the second mount 42 could be attached to the overhead airbag module housing 12 like the first mount 30, or the second mount 42 could be omitted entirely from the sun visor assembly 28. As depicted in FIG. 1, the visor panel 34 is connected to the second mount 42, but is capable of becoming detached in order to swivel to cover the side window 40 to block incident sun light. The visor panel 34 in this configuration interconnects the overhead airbag module housing 12 and the header 16. Because the first mount 30 is attached to the overhead airbag module housing 12 rearward of the header 16 and the opening 24, the sun visor assembly 28 is also located rearward of the opening 24 of the overhead airbag module housing 12 where the overhead airbag would deploy.

Figure 2:
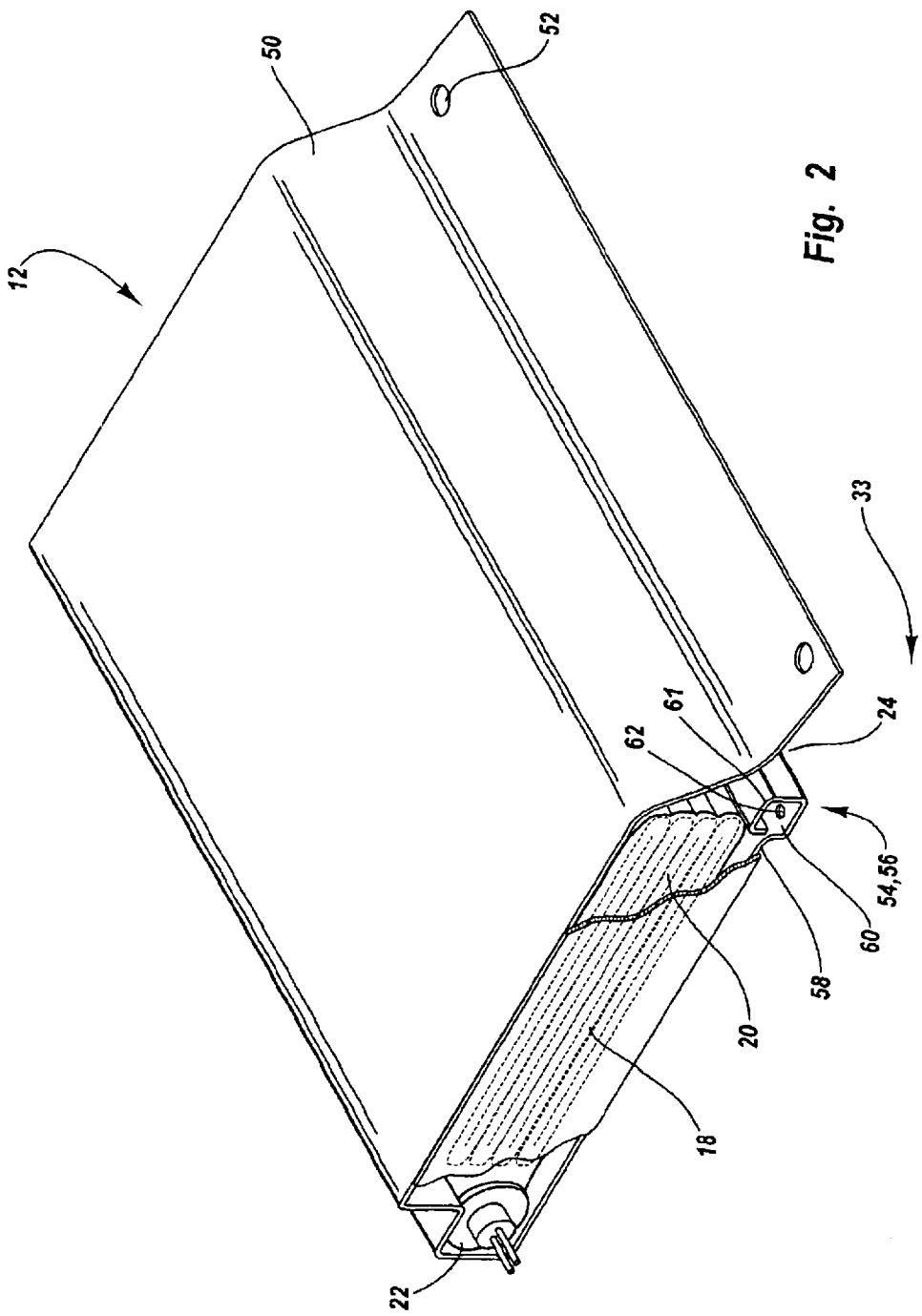
FIG. 2 is a cut-away perspective view of the overhead airbag module housing capable of receiving a sun visor attachment.

Referring to FIG. 2, an overhead airbag module housing 12 is depicted in a cutaway perspective view before installation in a vehicle. The overhead airbag module housing 12 defines a cavity 18 which houses an uninflated overhead airbag 20. The uninflated overhead airbag 20 is folded in a manner to facilitate the use of a thin cavity 18 that can be disposed between a vehicle roof and the headliner. An airbag inflator 22 is also disposed within the overhead airbag module housing 12 for rapidly inflating the overhead airbag 20 in a collision situation. The overhead airbag module housing 12 has an extension 50 that extends above the opening 24 through which the overhead airbag 20 deploys. The extension 50 is configured to mount the overhead airbag module housing 12 to the header 16 of the vehicle 10 (see FIG. 1). Locations for receiving a fastener are shown on the extension 50 in the form of apertures 52.

The overhead airbag module housing 12 has a first visor attachment member 54 positioned rearward of the opening 24 for receiving a sun visor. In this configuration the first visor attachment member 54 is a mounting bracket 56 located on the portion of the overhead airbag module housing 12 that defines the cavity 18. The first visor attachment member 54 is located on an outboard side 33 of the overhead airbag module housing 12. The mounting bracket 56 depicted here is an inseparable, integral part of the overhead airbag module housing 12. The mounting bracket 56 could be a support beam rigid enough to support a sun visor assembly. The mounting bracket 56 could also be a separately attachable bracket secured to the overhead airbag module housing 12 for receiving a sun visor assembly. The mounting bracket 56 depicted in FIG. 2 is an undivided, contiguous section of the same wall 58 of the overhead airbag module housing 12. The mounting bracket 56 forms a recess 60 in the overhead airbag module housing 12, and a shielding portion 61 to protect the uninflated overhead airbag 20 from contact with a fastener that could cause a tear or otherwise impede the trajectory of the overhead airbag 20 when it is activated. The mounting bracket 56 further has defined locations for receiving a fastener 62 that would attach the sun visor assembly to the overhead airbag module housing 12.

Figure 3:
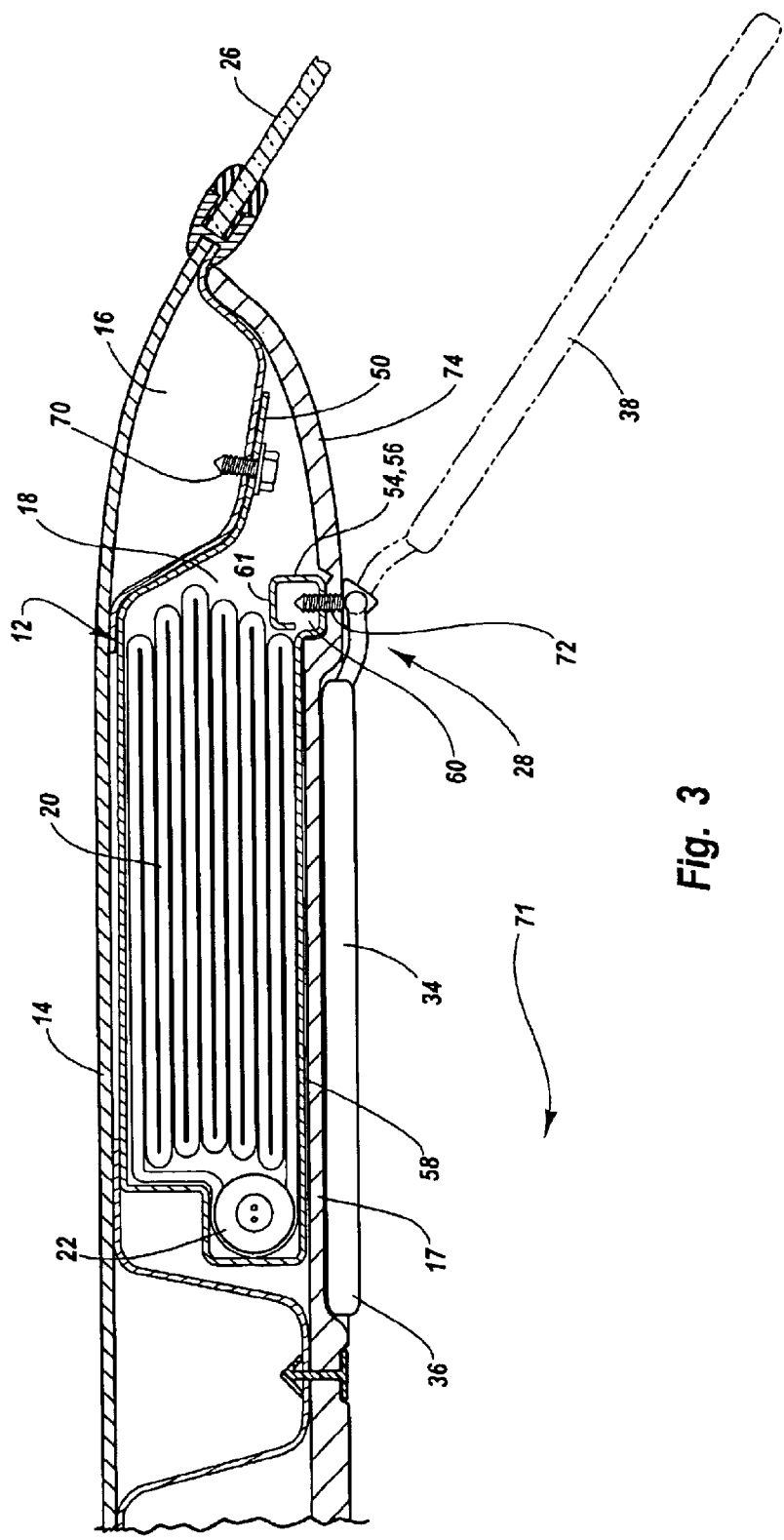
FIG. 3 is a side elevation, sectional view of a sun visor attached to the overhead airbag module housing when the overhead airbag is in an inactivated state.

Referring to FIG. 3, the overhead airbag module housing 12 is shown in a side elevation, sectional view disposed between the vehicle roof 14 and the headliner 17. The extension 50 of the overhead airbag module housing 12 is secured to the vehicle's header 16 by a fastener 70. It will be appreciated by those of skill in the art that a variety of fasteners 70 may be used to secure the overhead airbag module housing 12 to the header 16, including, but not limited to, bolts, screws, rivets, pins, and the like.

The overhead airbag module housing 12 defines a cavity 18 which contains an uninflated overhead airbag 20. The airbag inflator 22 is also depicted in a rear portion of the cavity 18. The wall 58 of the overhead airbag module housing 12 forms a first visor attachment member 54 in the form of a mounting bracket 56. A sun visor assembly 28 is shown attached to the mounting bracket 56 by a fastener 72. A variety of fasteners 72 may be used to secure the sun visor assembly 28 to the mounting bracket 56, including, but not limited to, bolts, screws, rivets, pins, and the like. The mounting bracket 56 forms a recess 60 and a shielding portion 61 in the overhead airbag module housing 12 to protect the overhead airbag 20 from contact with the fastener 72.

Referring still to FIG. 3, the sun visor assembly 28 is attached to the mounting bracket 56 such that the visor panel 34 is disposed rearward 71 of the door 74 of the overhead airbag module housing 12. The sun visor assembly 28 is also disposed rearward 71 of the header rail 16. The visor panel 34 is capable of being in a retained position 36 when not in use. In the retained position 36 the visor panel 34 is proximate the headliner 17 and substantially parallel to the plane created by the vehicle roof 14. The visor panel 34 in this position is located directly underneath the overhead airbag module housing 12 and not overlapping the door 74 through which the overhead airbag 20 is deployed. In the first deployed position 38 the visor panel 34 can block sunlight that passes through an upper portion of a windshield 26.

Figure 4:
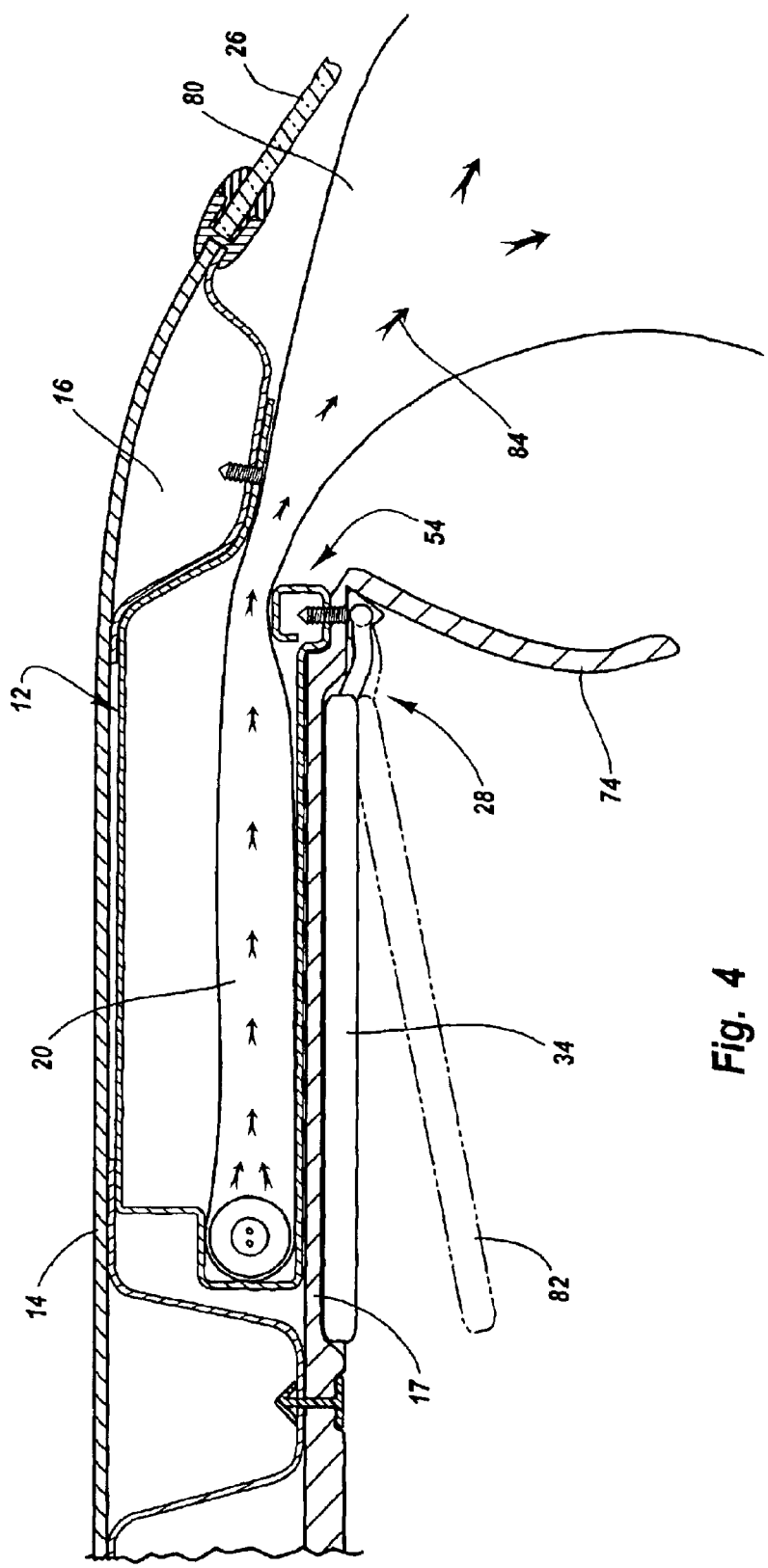
FIG. 4 is a side elevation, sectional view of a sun visor attached to the overhead airbag module housing when the overhead airbag is activated and deployed.

Referring to FIG. 4, the overhead airbag module housing 12 is shown in a side elevation, sectional view disposed between the vehicle roof 14 and the headliner 17 when the overhead airbag 20 is in an activated or inflating state 80. When deploying, the overhead airbag 20 exerts a force that opens the door 74 of the overhead airbag module housing 12, and deploys between the header 16 and the sun visor assembly 28. With the sun visor assembly 28 attached to the first visor attachment member 54, the visor panel 34 is located out of the path of the overhead airbag 20 in an inflating state 80. Even when the visor panel 34 is in the first deployed position 38 (as shown on FIG. 3), the force of the inflating overhead airbag 20 causes the door 74 of the overhead airbag module housing 12 to rotate the visor panel 34 to a position 82 out of the path of the inflating overhead airbag 20.

The overhead airbag 20 in an inflating state 80 has a trajectory 84 that causes the inflating overhead airbag 20 to deploy alongside and substantially parallel to the windshield 26 and in front of a vehicle passenger. The sun visor assembly 28, therefore, does not impede the trajectory 84 of the deploying overhead airbag 20. Since the sun visor assembly 28 does not interact with the overhead airbag 20 in an inflating state 80, the sun visor assembly 28 does not become fragmented or detached from its attachment 54.

Figure 5:
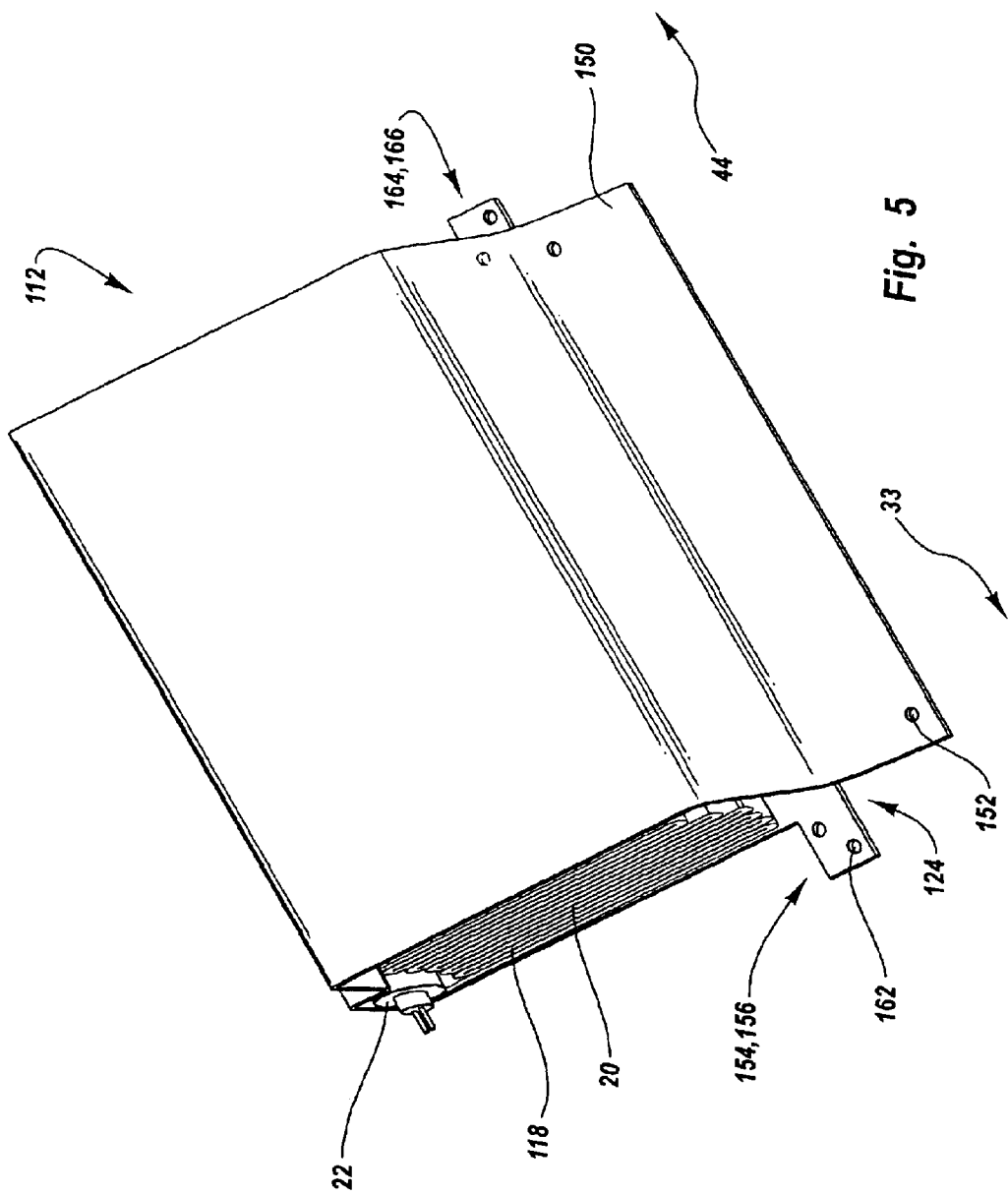
FIG. 5 is a perspective view of another embodiment of the overhead airbag module housing capable of receiving a sun visor attachment.

Referring to FIG. 5, another embodiment of the overhead airbag module housing 112 is depicted from a perspective view before installation into a vehicle. The overhead airbag module housing 112 defines a cavity 118 which houses an uninflated overhead airbag 20. An airbag inflator 22 is also disposed within the overhead airbag module housing 112. The overhead airbag module housing 112 has an extension 150 that extends above an opening 124 through which an overhead airbag 20 deploys. The extension 150 is configured to mount the overhead airbag module housing 112 to the header 16 of the vehicle 10 (see FIG. 1). Locations for receiving a fastener are shown on the extension 150 in the form of apertures 152.

The overhead airbag module housing 112 has a first visor attachment member 154 positioned rearward of the opening 124 for receiving a sun visor assembly. The first visor attachment member 154 is a first mounting bracket 156 located on an outboard side 33 of the overhead airbag module housing 112. The first mounting bracket 156 in this configuration is an extension of the overhead airbag module housing 112 that is adjacent to, but not part of, the cavity 118 that contains the overhead airbag 20. The first mounting bracket has defined locations 162 for receiving a fastener that would attach the sun visor assembly to the overhead airbag module housing 112.

Referring still to FIG. 5, a second sun visor attachment member 164 for receiving a sun visor assembly is shown. The second visor attachment member 164 is a second mounting bracket 166 located on an inboard 44 side of overhead airbag module housing 112. The sun visor assembly could be detachably connected to the second mounting bracket 166 so the visor panel could swivel to cover the upper portion of a side window of a vehicle.

It should be appreciated that both mounting locations for the sun visor assembly can be on the overhead airbag module housing 112 (as depicted in FIG. 5), or one mounting location could be on the overhead airbag module housing 112 and another on the vehicle header (as depicted in FIG.

1). In the latter instance, it is preferred to have the outboard mount located on the overhead airbag module housing and the inboard mount located on the vehicle header, the header mount being a retention clip that the visor panel may detach from.

Figure 6:
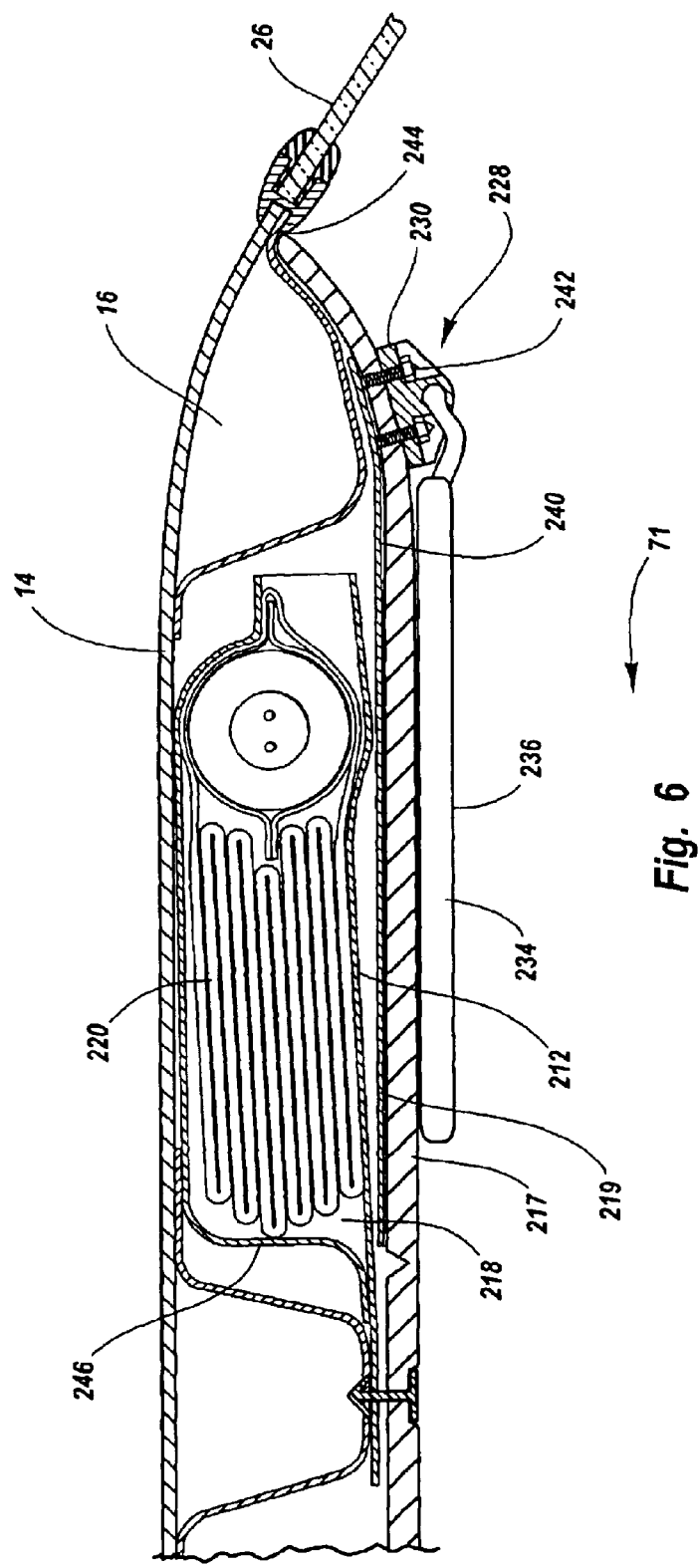
FIG. 6 is a side elevation, sectional view of a sun visor attachment substrate disposed between the overhead airbag module and the headliner when the overhead airbag is in an inactivated state.

Referring to FIG. 6, the sun visor assembly 228 is shown in a side elevation, sectional view attached to a resilient substrate 240 disposed between the headliner 217 and the overhead airbag module housing 212. The sun visor assembly 228 has a first mount 230 that is rigidly attached to the substrate 240 through the headliner 217 by one or more fasteners 242. It will be appreciated by those of skill in the art that a variety of fasteners 242 may be used to secure the sun visor assembly 228 to the substrate 240, including, but not limited to, bolts, screws, rivets, pins, and the like.

The substrate 240 should be constructed of a somewhat flexible resilient material, such as a resilient steel plate or a resilient injection molded plate that will give the sun visor assembly 228 a rigid attachment and feel so the sun visor assembly 228 does not fracture or separate from its attachment or damage the headliner 217 upon actuation. The substrate 240 typically is about 2 millimeters thick, but could vary depending on envelope size requirements between the headliner 217 and the vehicle roof 14. In any event, the substrate 240 is thin enough so that a vehicle passenger is unable to detect an appreciable difference between the sun visor assembly 228 attached to the substrate 240 and a conventional sun visor that is attached to the header rail 16.

The substrate 240 could be affixed to the interior 219 of the headliner 217 by an adhesive material. It will be appreciated by those of skill in the art that a variety of adhesive materials may be used to affix the substrate 240 to the headliner 217, including, but not limited to, glue, paste, cement, epoxy resins, or other adhesive resins. A portion of the substrate 240 is shown affixed to the headliner 217 directly below the header 16. The substrate 240 could be located further rearward 71 if desired, depending on the compatibility of the kind of sun visor used and the vehicle it is mounted to. If the overhead airbag module housing 212 has a door as an outlet for the overhead airbag 220 as shown in FIG. 4, the substrate 240 would be affixed to the headliner 217 rearward 71 of both the door and the header 16.

The substrate 240 has an area large enough to spread an actuation load that is created when a vehicle passenger actuates the visor panel 234 from a retained position 236 to a deployed position (not shown). The area can vary depending on the resiliency and robustness of the substrate 240. Typically, the length of the substrate 240 extends from just outside the outlet 244 of the overhead airbag module housing 212 rearward 71, proximate the rear edge 246 of the overhead airbag module housing 212. The width of the substrate 240 should extend at least from the outboard edge of the first mount 230 to an inboard edge of a second mount (see FIG. 9A). The area of the substrate 240 also should cover all areas of the headliner 217 that would interact with the overhead airbag 220 when activated. Therefore, the sun visor assembly 228 does not become detached from or damage the headliner 217 when the vehicle passenger pulls on the visor panel 234 to move it to a desired position because the force on the sun visor assembly 228 created by the passenger is spread across the area of the substrate 240 and against a larger area of the headliner 217 than it would be if the sun visor assembly 228 were attached simply to the headliner 217.

Referring still to FIG. 6, the sun visor assembly 228 is mounted to the substrate 240 directly below the header 16, such that a vehicle occupant would not be able to detect a difference between the present invention and a conventional system where the sun visor is attached directly to the header 16. The outlet 244 for the overhead airbag 220 is located near the junction of the headliner 217, the header 16, the vehicle roof 14, and the windshield 26. The sun visor assembly 228 is disposed rearward 71 of the outlet 244 such that the visor panel 234 is below the cavity 218 housing the overhead airbag 220 within the overhead airbag module housing 212.

Figure 7:
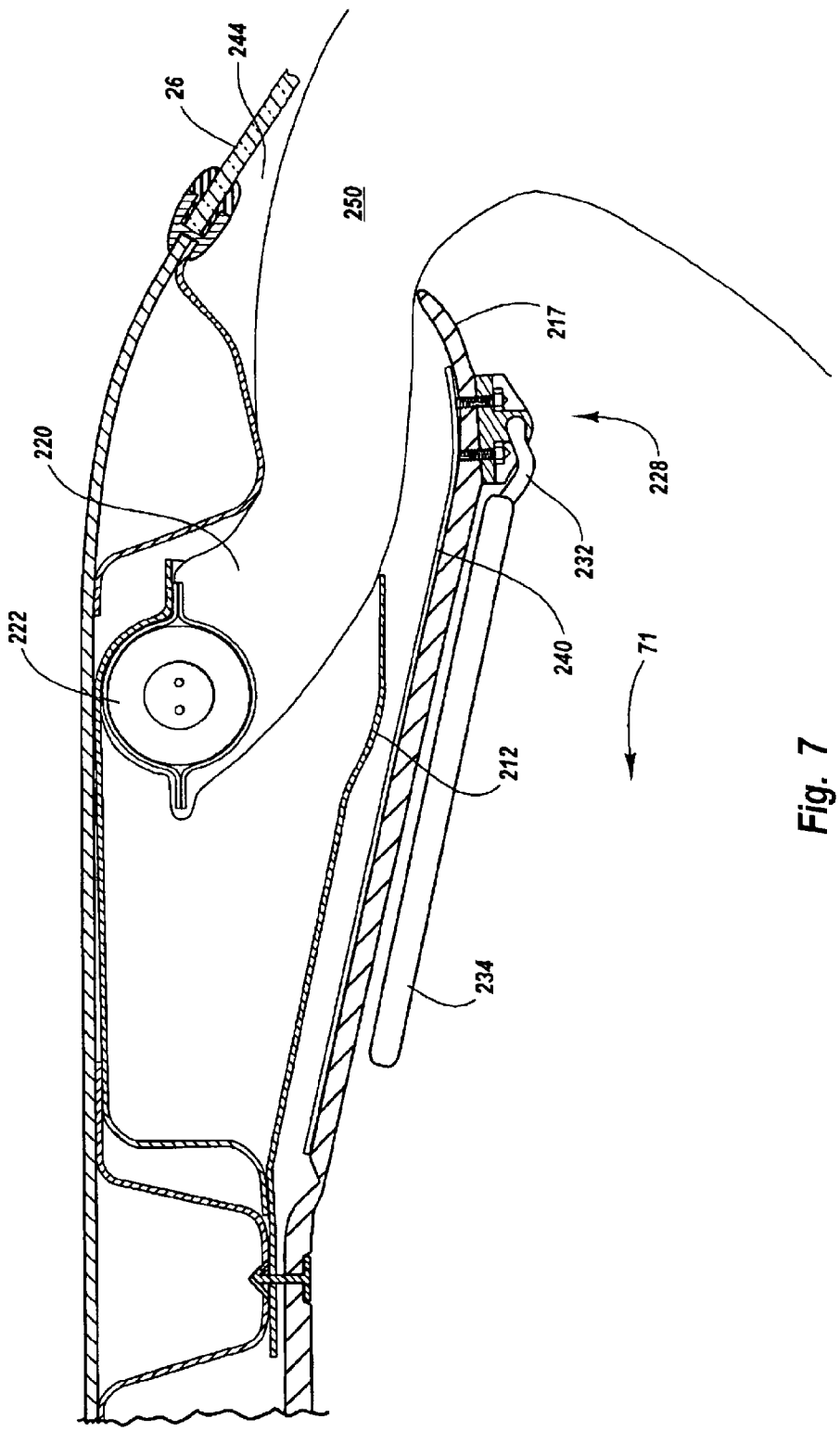
FIG. 7 is a side elevation, sectional view of a sun visor attachment substrate disposed between the overhead airbag module and the headliner when the overhead airbag is activated and deployed.

Referring to FIG. 7, the sun visor assembly 228 is shown in a side elevation, sectional view fastened to the substrate 240 when the overhead airbag 220 is inflating or inflated. In a collision, the airbag inflator 222 is activated, which inflates the overhead airbag 220. The inflated airbag cushion 250 forces the outlet 244 to enlarge so the inflated airbag cushion 250 can deploy out from between the headliner 217 and the header rail 16, down alongside the windshield 26 and in front of a vehicle passenger. Since the sun visor assembly 228, is mounted rearward 71 of the outlet 244 on the substrate 240, neither the visor panel 234 nor the pivot rod 232 is contacted by the inflating airbag cushion 250. The sun visor assembly 228 remains attached to its attachment location and does not become a dangerous projectile thereby. The sun visor assembly 228 further does not impede the trajectory of the inflating airbag cushion 250, which would diminish the effectiveness of the cushion 250 to protect the vehicle occupant.

The substrate 240 extends along a length of the headliner 217 that must bend when the inflating airbag cushion 250 exits the overhead airbag module housing 212. Because the substrate 240 defines the portion of the headliner 217 that bends when the overhead airbag 220 activates, it prevents the headliner 217 from over-extending or over-rotating and becoming permanently deformed by the inflating airbag cushion 250. The substrate 240 also helps to channel the trajectory of the inflating airbag cushion 250 so that it deploys properly, thereby maximizing the effectiveness of the inflated cushion 250 in protecting the vehicle occupant.

Referring to FIGS. 8A and 8B, a conventional headliner 301 is shown attached to a header rail 16 by the sun visor mount 303 in plan view and side elevation, sectional view, respectively. The sun visor assembly 305 is traditionally mounted to the header 16 by fasteners 307 through the headliner 301. The traditional headliner 301 also includes a cut out portion 309 for fitting around an A-pillar 311 of the vehicle frame. This configuration is what allowed for rigid attachment of the headliner 301 proximate the vehicle roof 14. Without the rigid attachment to the header 16 provided by the first sun visor mount 303 the headliner 301 would not maintain its position proximate the vehicle roof 14 and could become detached. In a collision, an overhead airbag would deploy from the overhead airbag module 313, through the headliner 301 and toward the windshield 26. The trajectory of the expanding overhead airbag would then be impeded by the sun visor assembly 305 because of its mounting location to the header 16.

Referring to FIG. 9A, the headliner 401 of the present invention is shown from a cut-away plan view rigidly attached to the A-pillar 311, rather than the header 16 by the sun visor assembly 405. The A-pillar 311 is the corner post of a vehicle frame between the windshield 26 and the front side window. A substrate 415 is affixed to the headliner 401 between the headliner 401 and the vehicle roof 14 as shown in FIG. 9B (side elevation, sectional view). The substrate 415 has defined locations 417 for receiving fasteners 407 that would affix the sun visor assembly 405 to the substrate 415. These defined locations 417 could contain weld nuts 419 or other similar fastener-attaching components such as nuts, caps, clamps, catches and the like for retaining the fasteners 407 in position.

The substrate 415 has an area 421 that covers the length of the visor panel 406 extending between the first mount 403 to the second mount 404 and from the header 16 to a rear edge 423 of the overhead airbag module 413. The area 421 described is merely typical, and the area 421 can vary depending on the resiliency and robustness of the substrate 415. The area 421 should cover all areas of the headliner 401 that would interact with the overhead airbag 413 when activated. The area 421 should also be large enough to spread an actuation load that is created when a vehicle passenger actuates the visor panel 406 from a retained position 425 to a deployed position (not shown).

Since the sun visor assembly 405 does not attach the headliner 401 to the header 16 as shown in the conventional configuration (FIGS. 8A, 8B), a mounting strap 427 is used to rigidly connect the headliner 401 to an A-pillar 311 of the vehicle frame. The mounting strap 427 in the present embodiment is defined by a cut-out portion 409 of a corner of the headliner 401. The mounting strap 427 could also be a separate strap for interconnecting the headliner 401 and the vehicle frame. Furthermore, any kind of flap, integral with the headliner 401 or not, could be rigidly attached to a portion of the vehicle frame other than the A-pillar 311 as well. The mounting strap 427 could be attached to the A-pillar 311 by use of a fastener 429, adhesive or the like. The A-pillar 311 trim then covers the mounting location of the headliner 401 to the A-pillar 311.

Accordingly, the sun visor attachment system of the present invention presents significant improvements in addressing the problem of sun visor compatibility with overhead airbags. By attaching the sun visor assembly to a visor attachment member rearward of an overhead airbag module outlet, instead of on the header rail, the deploying airbag cushion does not impinge on the sun visor pivot rod or panel so that the sun visor does not separate from its attachment or fragment possibly causing injury to the vehicle occupants. When the sun visor is out of the path of the deploying airbag, its trajectory is not impeded and the airbag cushion is positioned correctly and proper occupant restraint is achieved.

Furthermore, the sun visor attachment system of the present invention is able to maintain the aesthetic characteristics of a conventional visor because the visor assembly does not differ markedly from a conventional visor assembly. In fact, a conventional visor assembly could easily be used to attach to the visor attachment member of the present invention. If a conventional visor assembly is used, or a visor assembly with similar characteristics, it is also simple to install, and the use of a new attachment system is not cost prohibitive.

The present invention may be embodied in other specific forms without departing from its structures, methods, or other essential characteristics as broadly described herein and claimed hereinafter. The described embodiments are to be considered in all respects only as illustrative, and not restrictive. The scope of the invention is, therefore, indicated by the appended claims, rather than by the foregoing description. All changes that come within the meaning and range of equivalency of the claims are to be embraced within their scope.

What is claimed and desired to be secured by United States Letters Patent is:

1. An overhead airbag module housing, comprising:
   a cavity for containing an airbag;
   an airbag outlet, positioned such that the airbag deploys through the outlet and in front of a vehicle passenger; and
   a first sun visor attachment member for receiving a sun visor, positioned rearward of the outlet such that the sun visor does not interfere with a trajectory of the airbag when deployed;
   wherein the first sun visor attachment member is positioned on the overhead airbag module housing that defines the cavity for containing the airbag and wherein the first sun visor attachment member forms a recess in the housing, such that an undeployed airbag is kept out of contact with a fastener used to attach the sun visor to the sun visor attachment member.

2. The overhead airbag module housing of claim 1, wherein the airbag can deploy between a header of a vehicle and the sun visor when the sun visor is mounted to the first sun visor attachment member.

3. The overhead airbag module housing of claim 2, wherein the sun visor interconnects the first sun visor attachment member and the header.

4. The overhead airbag module housing of claim 2, further comprising a second sun visor attachment member positioned rearward of the outlet, on an inboard side of the vehicle, and the first sun visor attachment member is located on an outboard side of the vehicle.

5. The overhead airbag module housing of claim 4, wherein the first and second sun visor attachment members are located adjacent, but not part of, the cavity for containing the airbag.

6. The overhead airbag module housing of claim 2, wherein the first sun visor attachment member is a resilient substrate capable of being affixed between a headliner and a roof of the vehicle.

7. The overhead airbag module housing of claim 6, wherein the substrate is a resilient steel plate.

8. The overhead airbag module housing of claim 6, wherein the substrate is a resilient injection molded plate.

9. The overhead airbag module housing of claim 6, wherein the substrate is affixed to the headliner that has a mounting flap for attaching the headliner to a frame of the vehicle.

10. The overhead airbag module housing of claim 9, wherein the mounting flap is a strap attachable to an A-pillar of the vehicle.

11. The overhead airbag module housing of claim 10, wherein the substrate is disposed between the overhead airbag module housing and the headliner.

12. The overhead airbag module housing of claim 11, wherein the substrate has an area sufficient to spread an actuation load when the sun visor is actuated, such that the sun visor does not become detached from or damage the headliner.

13. An overhead airbag module housing, comprising:
   a cavity for containing an airbag;
   a door, positioned such that the airbag deploys through the door and in front of a vehicle passenger; and
   a first mounting bracket positioned rearward of the door for pivotably connecting to a sun visor, such that the sun visor does not interfere with a trajectory of the airbag when deployed
   wherein the first mounting bracket is an inseparable, integral part of the overhead airbag module housing.

14. The overhead airbag module of claim 13, further comprising a second mounting bracket for detachably connecting to the sun visor, wherein the second mounting bracket is positioned rearward of the door and on an inboard side of a vehicle, and the first mounting bracket is positioned on an outboard side of the vehicle.

15. The overhead airbag module of claim 13, wherein the first mounting bracket is positioned on the overhead airbag module housing that defines the cavity for containing the airbag.

16. The overhead airbag module of claim 14, wherein the first and second mounting brackets are positioned adjacent, but not part of, the cavity for containing the airbag.

17. The overhead airbag module of claim 13, wherein the sun visor is attachable to the first mounting bracket and a header of a vehicle.

18. A sun visor attachment assembly to be used in conjunction with an overhead airbag module, comprising:
   a resilient substrate for receiving a sun visor, the substrate affixed between a headliner and the overhead airbag module behind an outlet through which an airbag deploys, such that a sun visor can be attached to the substrate out of a trajectory of the airbag when deployed.

19. The sun visor attachment assembly of claim 18, wherein the sun visor can be rigidly attached to the substrate behind the outlet.

20. The sun visor attachment assembly of claim 18, wherein the outlet of the overhead airbag module is located between the substrate and a header of a vehicle such that the airbag deploys between the substrate and the header of the vehicle.

21. The sun visor attachment assembly of claim 18, wherein the substrate is a resilient steel plate.

22. The sun visor attachment assembly of claim 18, wherein the substrate is a resilient injection molded plate.

23. The sun visor attachment assembly of claim 18, wherein the headliner has a mounting flap for attaching the headliner to a frame of a vehicle.

24. The sun visor attachment assembly of claim 23, wherein the mounting flap is a strap attachable to an A-pillar of the vehicle.

25. The sun visor attachment assembly of claim 18, wherein the substrate has an area sufficient to spread an actuation load when the sun visor is actuated, such that the sun visor does not become detached from or damage the headliner.

26. The sun visor attachment assembly of claim 18, wherein the substrate has a plurality of defined locations for receiving a plurality of fasteners in attaching the sun visor to the substrate.

27. The sun visor attachment assembly of claim 18, wherein the substrate has a plurality of weld nuts for receiving a plurality of fasteners in attaching the sun visor to the substrate.

28. A sun visor attachment assembly to be used in conjunction with an overhead airbag module, comprising:
   a headliner for covering an interior portion of a vehicle roof and the overhead airbag module;
   a resilient substrate affixed between the headliner and the overhead airbag module just rearward of an outlet through which an airbag deploys, such that a sun visor can be attached to the substrate out of a trajectory of the airbag when deployed; and
   a mounting strap for attaching the headliner to an A-pillar of a vehicle.

29. The sun visor attachment assembly of claim 28, wherein the substrate is a resilient steel plate.

30. The sun visor attachment assembly of claim 28, wherein the substrate is a resilient injection molded plate.

31. The sun visor attachment assembly of claim 28, wherein the mounting strap is a cut-out section of the headliner.

32. The sun visor attachment assembly of claim 31, wherein the substrate has an area sufficient to spread an actuation load when the sun visor is actuated, such that the sun visor does not become detached from or damage the headliner.

33. The sun visor attachment assembly of claim 32, wherein the substrate has a plurality of defined locations for receiving a plurality of fasteners in attaching the sun visor to the substrate.

34. The sun visor attachment assembly of claim 33, wherein the plurality of defined locations have a plurality of weld nuts for receiving a plurality of fasteners in attaching the sun visor to the substrate.

35. An overhead airbag module housing, comprising:
   a cavity for containing an airbag;
   an airbag outlet, positioned such that the airbag deploys through the outlet and in front of a vehicle passenger; and
   a sun visor attachment means for receiving a sun visor rearward of the outlet, such that the sun visor does not interfere with a trajectory of the airbag when deployed;
   further comprising a load spreading means for spreading an actuation load of the sun visor when the sun visor is actuated, such that the sun visor does not become detached from or damage the headliner.

36. The overhead airbag module housing of claim 35, wherein the airbag deploys between a header of a vehicle and the sun visor when the sun visor is engaged with the sun visor attachment means.

37. The overhead airbag module housing of claim 36, wherein the sun visor attachment means is positioned on the overhead airbag module housing that defines the cavity for containing the airbag.

38. The overhead airbag module housing of claim 36, wherein the sun visor attachment means is located adjacent, but not part of, the cavity for containing the airbag.

39. The overhead airbag module housing of claim 36, wherein the sun visor interconnects the sun visor attachment means and the header.

40. The overhead airbag module housing of claim 36, wherein the sun visor attachment means is affixed between a headliner and the overhead airbag module housing.

41. The overhead airbag module housing of claim 40, further comprising a securing means for securing the headliner to a vehicle frame.

42. The overhead airbag module housing of claim 41, wherein the securing means secures the headliner to an A-pillar of the vehicle.

* * * * *